United States Patent [19]

Gabano

[11] 4,371,592

[45] Feb. 1, 1983

[54] PRIMARY CELL OF HIGH ENERGY DENSITY IN WHICH THE ANODE ACTIVE MATERIAL IS AN ALKALI METAL

[75] Inventor: Jean-Paul Gabano, Poitiers, France

[73] Assignee: Gipelec, Levallois-Perret, France

[21] Appl. No.: 243,796

[22] Filed: Mar. 16, 1981

[30] Foreign Application Priority Data

Mar. 28, 1980 [FR] France ............................ 80 07077
Dec. 30, 1980 [FR] France ............................ 80 27802

[51] Int. Cl.$^3$ .......................................... H01M 4/58
[52] U.S. Cl. ........................................ 429/91; 429/101; 429/197; 429/199
[58] Field of Search ............... 429/101, 194, 196, 197, 429/199, 218, 105, 90, 91

[56] References Cited

U.S. PATENT DOCUMENTS

| | | | |
|---|---|---|---|
| 3,891,458 | 6/1975 | Eisenberg | 429/218 |
| 3,922,174 | 11/1975 | Heller | 429/196 |
| 3,923,543 | 12/1975 | Auborn et al. | 429/101 X |
| 4,184,007 | 1/1980 | Urry | 429/8 |
| 4,293,622 | 10/1981 | Marincie et al. | 429/101 X |

OTHER PUBLICATIONS

C. R. Schlaikjer, "Discharge Reaction Mechanisms in Li/SOCl$_2$ Cells", Apr. 1979, Jour. of Electrochemical Soc., Princeton, N.J., vol. 126, No. 4, p. 513, Abstract; p. 514, col. 2; p. 517, col. 2, last line.

*Primary Examiner*—Anthony Skapars
*Attorney, Agent, or Firm*—Kenyon & Kenyon

[57] ABSTRACT

A primary cell of high specific energy in which the anode active material (16) is an alkali metal and the cathode active material is sulphur oxychloride which simultaneously acts as an electrolyte solvent, said electrolyte further containing a dissolved salt and a co-solvent. The co-solvent is chosen from among phosphoryl chloride and benzoyl chloride; the dissolved salt is lithium tetrachloroaluminate.

9 Claims, 4 Drawing Figures

PRIMARY CELL OF HIGH ENERGY DENSITY IN WHICH THE ANODE ACTIVE MATERIAL IS AN ALKALI METAL

The invention relates to primary cells of high energy density in which the anode active material is an alkali metal, e.g. lithium, and in which the cathode active material is an inorganic solvent which simultaneously acts as an electrolyte solvent and is constituted by a sulphur oxychloride such as thionyl chloride or sulphuryl chloride. Due to the fact that these cells have good shelf-life and are of high performance, more and more applications are found for them and, in particular, people have begun to envisage their application to pacemakers. In this type of application, it is necessary to have warning when the end of discharge is near while the cell is still operating usefully.

BACKGROUND OF THE INVENTION

Means have already been applied in conventional electric cells containing aqueous electrolyte to observe the state of charge of the electric cell. They consist in providing at least one of the electrodes with a plurality of active materials which discharge successively at voltage plateaus which are close to but distinct from one another. Thus, French Pat. No. 1 151 414 uses zinc, cadmium and iron to constitute the negative electrode in a pilot storage cell which is charged and discharged at the same time as the battery whose state of charge is to be determined. The disadvantage of such a solution is that a foreign active material is added which can impair the operation of the electric cell.

Further, in U.S. Pat. No. 3,891,458, it is recommended to add a dissolved substance to a primary cell whose cathode active material and electrolyte solvent are thionyl chloride, said dissolved substance being chosen from the group consisting mainly of phosphoryl chloride, sulfolane and sulphur dioxide. However, the examples quote only dissolved substances in concentrations that are too low to provide a second discharge plateau (for phosphoryl chloride, the concentration provided for is 1.5 moles per liter, i.e. 12% by volume).

Preferred embodiments of the present invention mitigate these drawbacks.

SUMMARY OF THE INVENTION

The invention provides a primary cell of high specific energy in which the anode active material is an alkali metal and the cathode active material is sulphur oxychloride, which simultaneously acts as an electrolyte solvent, said electrolyte further containing a dissolved salt and a co-solvent whose reduction potential relative to said alkali metal is less than the reduction potential of sulphur dioxide, wherein the proportions (by volume) of the co-solvent relative to the solvent and co-solvent mixture lie between 30% and 45%.

In these conditions, when the sulphur oxychloride is consumed, the sulphur dioxide which comes from its reduction and which is dissolved in the co-solvent is reduced in its turn at a potential which is a little lower than the reduction potential of the oxychloride; so that while the cell continues the discharge usefully, there is a detectable change in its state.

Indeed, by way of example, the reduction reaction of thionyl chloride is as follows in a cell where the alkali metal is lithium:

$$4SOCl_2 + 8Li \rightarrow 8LiCl + 2S + 2SO_2$$

The sulphur dioxide is reduced according to the reaction:

$$2SO_2 + 2Li \rightarrow Li_2S_2O_4.$$

It is possible to use phosphoryl chloride or benzoyl chloride as a co-solvent. Rather surprisingly, it has been observed that according to the proportions of co-solvent used, the discharge plateaus (the first of which is the sulphur oxychloride discharge plateau and the second of which is the sulphur dioxide discharge plateau) pass through respective maxima. These proportions which constitute critical values have consequently been determined by said maxima.

BRIEF DESCRIPTION OF THE DRAWINGS

The invention will be better understood from the example described hereinbelow with reference to the accompanying drawings in which.

DESCRIPTION OF PREFERRED EMBODIMENTS

Figure 1:
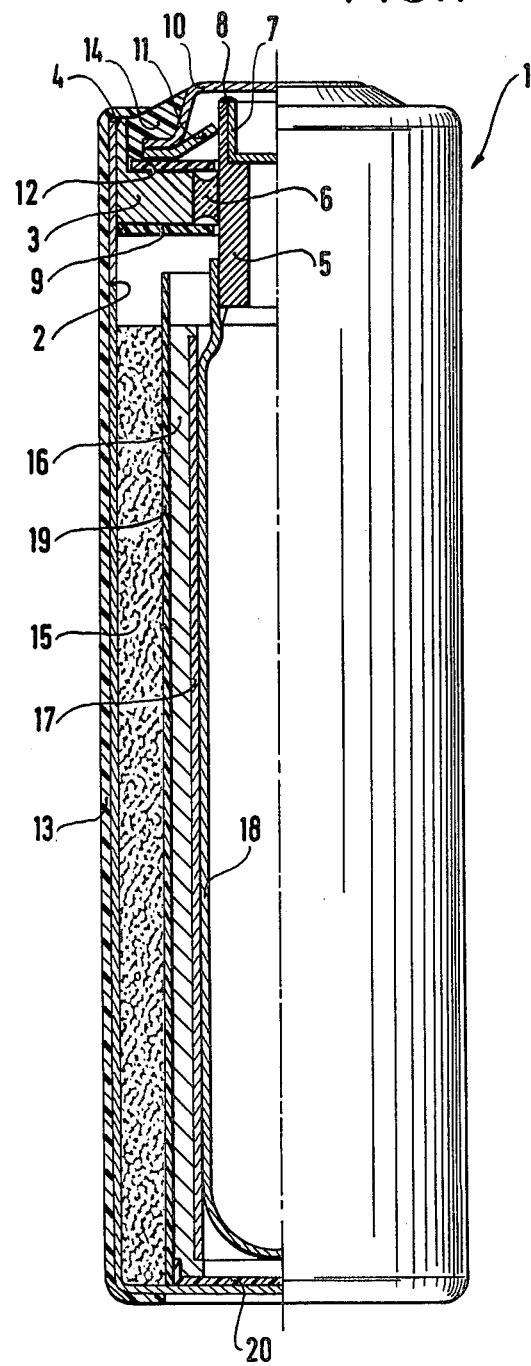
FIG. 1 is a partial cross-section of a cell in accordance with the invention.

FIG. 1 is a partial cross-section of a primary cell 1 in accordance with the invention. The cell includes a cup 2 made of a composite sheet constituted by a stainless steel layer and a nickel layer laminated together, the nickel layer being on the inside. The cup is closed by a stainless steel ring 3 bonded at 4 to the edge of the cup and electrically insulated from a ferro-nickel alloy cylinder 5 by a glass seal 6. The cylinder 5 is closed by a ferro-nickel alloy plug 7 which is bonded to it at 8. A polytetrafluoroethylene disk 9 protects the ring 3 and the cell's components from chemical attack.

The cell is thus hermetically sealed. It is finished off outside by a stainless steel cap 10 which covers the top of the cylinder 5 and which is in contact with a ring 11 that is force fitted onto the cylinder 5. The ring 11 is insulated from the ring 3 by a polytetrafluoroethylene ring 12.

The cup is enclosed in a polyvinyl chloride sheath 13, and a layer of thermosetting resin 14 protects the edges of the cap 10.

A cathode 15 or, more precisely, a cathode collector, is a porous cylinder constituted by a mixture of 85% acetylene black and 15% polytetrafluoroethylene in contact with the cup 2. An anode 16 is constituted by a sheet of lithium wound on an anode collector 17 which is itself constituted by a spirally wound sheet of stainless steel. A stainless steel spring 18 tends to push the anode towards the cathode collector 15 from which it is separated by a separator 19. A polytetrafluoroethylene disk 20 insulates the anode from the bottom of the cup 2. The spring 18 is bonded to the cylinder 5 so that the cap 10 constitutes the negative terminal of the cell whose positive terminal is constituted by the bottom of its cup 2 which is left uncovered by the sheath 13.

In the example described, the outer dimensions of the cell correspond to the dimensions of R6 cells standardized by the International Electrotechnical Commission. The height of the cathode collector is 40 mm and its thickness is 4 mm. The lithium anode weighs 0.492 g, which corresponds to a capacity of 1.9 Ah. The cell contains 3.7 cm$^3$ of an electrolyte constituted by a mixture of 60% of thionyl chloride and 40% of phosphoryl chloride in which solution 0.5 mole of lithium tetrachloroaluminate is dissolved.

Figure 2:
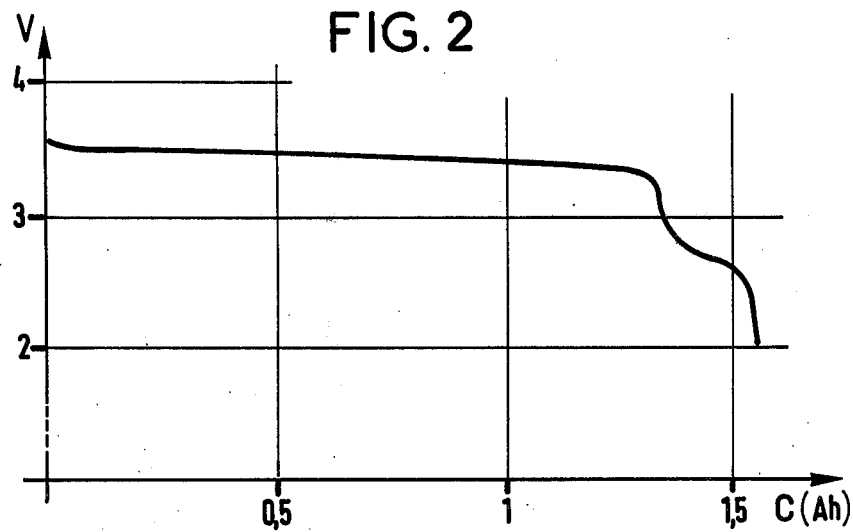
FIG. 2 is a graph showing the discharge of a cell in accordance with the invention.

This cell when discharged through a resistance of 1000 ohms at a temperature of 25° C. gives the discharge curve shown by the graph in FIG. 2.

In this figure, the discharge capacity C measured in ampere-hours is plotted along the X-axis and the voltage V across the terminals measured in volts is plotted along the Y-axis.

It is seen that up to a capacity of about 1.4 Ah, the cell discharges on a first plateau situated at about 3.5 volts, then its voltage drops to a second plateau of about 2.9 volts. This corresponds to the reduction potential of sulphur dioxide and not to the reduction potential of phosphoryl chloride which is about 2.5 volts.

The reduction potential of phosphoryl chloride leads directly to a voltage drop of about 1 volt and this is too high for the majority of devices. The sulphur dioxide reduction plateau is therefore an essential step.

Figure 3:
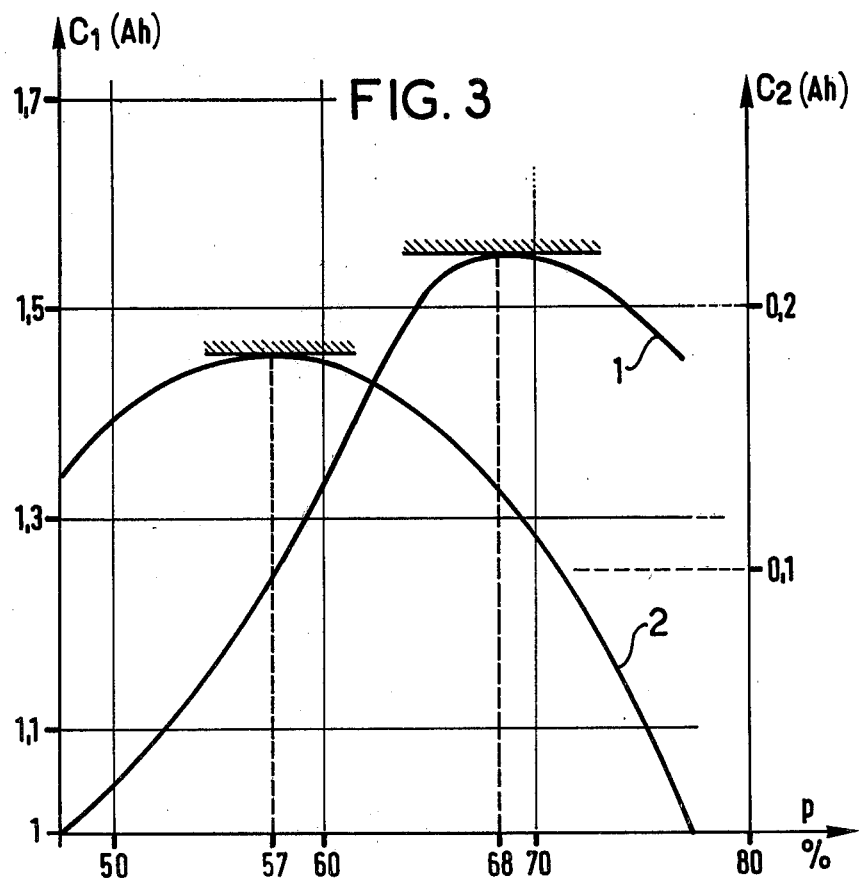
FIG. 3 illustrates the variation in the capacity of the discharge plateaus of cells in accordance with the invention.

Analogous primary cells have been discharged, varying the respective proportions of thionyl chloride and of phosphoryl chloride. The results of these tests are shown in FIG. 3 in which the scale of the X-axis represents the volume percentage p of thionyl chloride. Two scales are shown on the Y-axis, the left-hand scale corresponding to the capacity $C_1$ in ampere-hours of the first discharge plateau of FIG. 2 and the right-hand scale corresponding to the capacity $C_2$ in ampere-hours of the second plateau of FIG. 2 for each proportion of solvent and of co-solvent.

Curve 1 corresponds to the first plateau and curve 2 corresponds to the second plateau. As illustrated, the capacity of each plateau passes through a maximum where p is equal to 68% and 57% respectively, which corresponds to a proportion (by volume) of co-solvent relative to the solvent/co-solvent mixture lying between 32% and 43%. Preferred values are about 40% or p=60%. These maxima correspond to critical values of the relative proportions of solvent and of co-solvent, and to produce usable primary cells in accordance with the invention, the proportions should be chosen from between the two critical values.

Discharged at 70° C. to simulate a long storage period, these cells give even better results than during discharge at ambient temperature.

The lithium tetrachloroaluminate of the electrolyte could be replaced by lithium hexachloroantimoniate.

Likewise, analogous results from the point of view of proportions of solvent and of co-solvent are obtained by replacing thionyl chloride by sulphuryl chloride.

Figure 4:
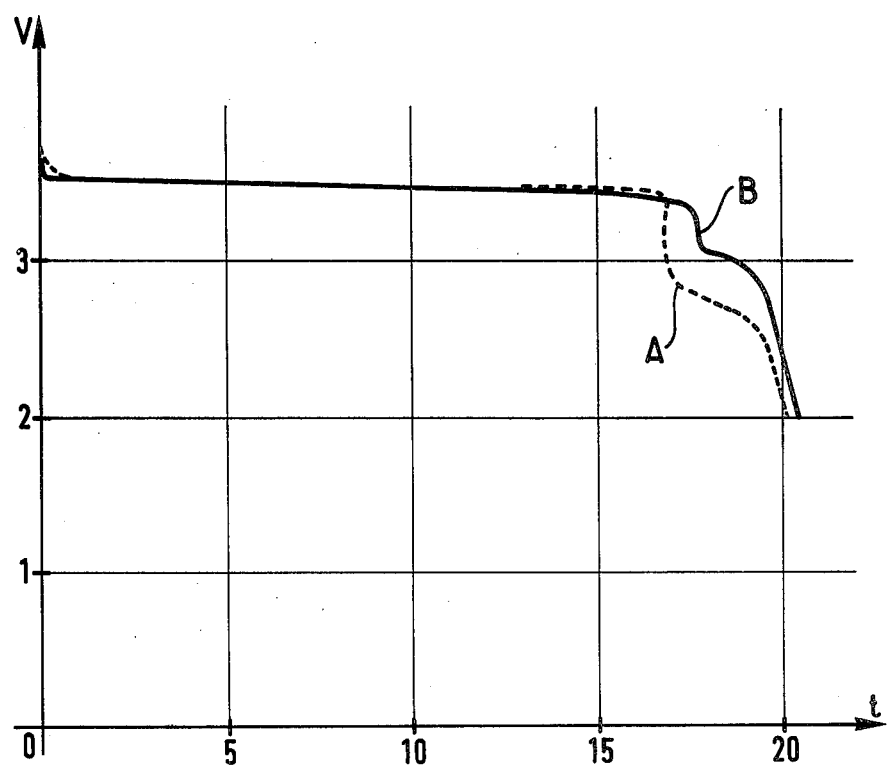
FIG. 4 is a graph showing the discharge curve (A) of a cell in accordance with the invention containing phosphoryl chloride and the discharge curve (B) of a cell containing benzoyl chloride.

Let us now refer to the discharge curves of FIG. 4.

Two series of primary cells in accordance with the invention are installed, the only difference being the composition of the electrolyte.

Series A corresponds to the type described hereinabove: the electrolyte is made of 60% thionyl chloride, 36% phosphoryl chloride and 4% lithium tetrachloroaluminate (all the percentages are given by volume). The concentration of the solute corresponds approximately to 0.5 moles per liter.

In series B, the electrolyte is made of 58.7% thionyl chloride, 33.3% benzoyl chloride, and 8% lithium tetrachloroaluminate (about 1M).

These two series of primary cells were discharged through a resistance of 1000 ohms at ambient temperature.

Discharge curves A and B are shown in FIG. 4 where the voltages V are plotted along the Y-axis and time t in days is plotted along the X-axis. The dashed line curve A represents the average of the first series and the solid line curve B represents the average of the second series.

As shown, curve B has a second plateau at the end of discharge, at a slightly higher potential than that of the second plateau of series A. The efficiency of the first plateau (discharge of $SOCl_2$) is 85.7% for series A and 90% for series B, while the efficiency of the second plateaus is 54.6% and 47% respectively, calculated on the quantity of $SO_2$ formed when discharging.

It is seen that with benzoyl chloride, the plateau occurs at a potential of a little more than 3 volts. This may be an advantage in some applications where the potential must not drop too much, even though it must drop to give warning.

Lastly, adding benzoyl chloride makes it possible to dissolve concentrations of lithium tetrachloroaluminate of up to 1.5 moles per liter.

Of course, the invention is not limited to the example which has just been described.

I claim:

1. A cell of high specific energy in which the anode active material is an alkali metal and the cathode active material is sulphur oxychloride which simultaneously acts as an electrolyte solvent, said electrolyte further containing a dissolved salt and a co-solvent whose reduction potential relative to said alkali metal is less than the reduction potential of sulphur dioxide, wherein the proportions (by volume) of the co-solvent relative to the solvent and co-solvent mixture lie between 32% and 43%, so as to obtain, in the discharge curves (voltage as a function of the discharge capacity) a second perceptible discharge plateau at the level of the reduction potential of sulphur dioxide.

2. A cell according to claim 1, wherein the alkali metal is lithium.

3. A cell according to claim 1, wherein the proportion of the co-solvent is 40%.

4. A cell according to claim 1, wherein said solvent is thionyl chloride.

5. A cell according to claim 1, wherein said solvent is sulphuryl chloride.

6. A cell according to claim 1, wherein said co-solvent is phosphoryl chloride.

7. A cell according to claim 1, wherein said co-solvent is benzoyl chloride.

8. A cell according to claim 1, wherein said dissolved salt is chosen from the group including lithium tetrachloroaluminate and lithium hexachloroantimoniate ($SbCl_6Li$).

9. A primary cell according to claim 7, wherein the dissolved salt is lithium tetrachloroaluminate at a concentration of 0.8 to 1.5 moles per liter.

* * * * *